United States Patent [19]

Copeland

[11] Patent Number: 5,277,743
[45] Date of Patent: Jan. 11, 1994

[54] PANEL SEALING SYSTEM

[76] Inventor: Nancy S. Copeland, 6416 Saddle Dr., Columbia, Md. 21045

[21] Appl. No.: 852,717

[22] Filed: Mar. 17, 1992

[51] Int. Cl.$^5$ ............................................. B32B 31/00
[52] U.S. Cl. .................................... 156/556; 156/212; 156/285; 156/286
[58] Field of Search ............... 156/285, 286, 556, 212, 156/216, 223, 557

[56] References Cited

U.S. PATENT DOCUMENTS

| | | | |
|---|---|---|---|
| 3,202,561 | 8/1965 | Swanson et al. | 156/286 |
| 3,912,542 | 10/1975 | Hirano et al. | 156/312 |
| 4,032,387 | 6/1977 | Sugiyama et al. | 156/285 |
| 4,447,282 | 5/1984 | Valerio et al. | 156/285 |
| 4,664,737 | 5/1987 | Schlosstein | 156/285 |
| 4,666,540 | 5/1987 | Halls | 156/286 |
| 4,894,102 | 1/1990 | Halls et al. | 156/285 |
| 4,997,507 | 3/1991 | Meyer | 156/285 |
| 5,098,498 | 3/1992 | Hale et al. | 156/286 |

Primary Examiner—David A. Simmons
Assistant Examiner—William J. Matney, Jr.
Attorney, Agent, or Firm—Morton J. Rosenberg; David I. Klein

[57] ABSTRACT

A panel sealing system (10) is provided for heat sealing a plastic layer (18) to a panel member (20). The panel sealing system (10) includes a base frame (22) which has a pair of fixedly located end section frames (32) extending on opposing sides of a heating housing (24). Displaceable internal end section base frame housings (34) are mounted within the end section frames (32) and allow for displacement of panel members (20) and plastic layers (18) to be displaced internal to a heating chamber (36) of heating housing (24). The heat within the heat chamber (36) is adjusted by vertical adjustment of electrical housings (84) contained within the heat chamber (36). Additionally, drive mechanism (62) is provided to remove the heat sealed panel subsequent to the heat sealing operation within the heat chamber (36). In this manner, panel members (20) are optimally heat sealed by a continuous closed cell coating or layer which extends the life of the panel member.

13 Claims, 5 Drawing Sheets

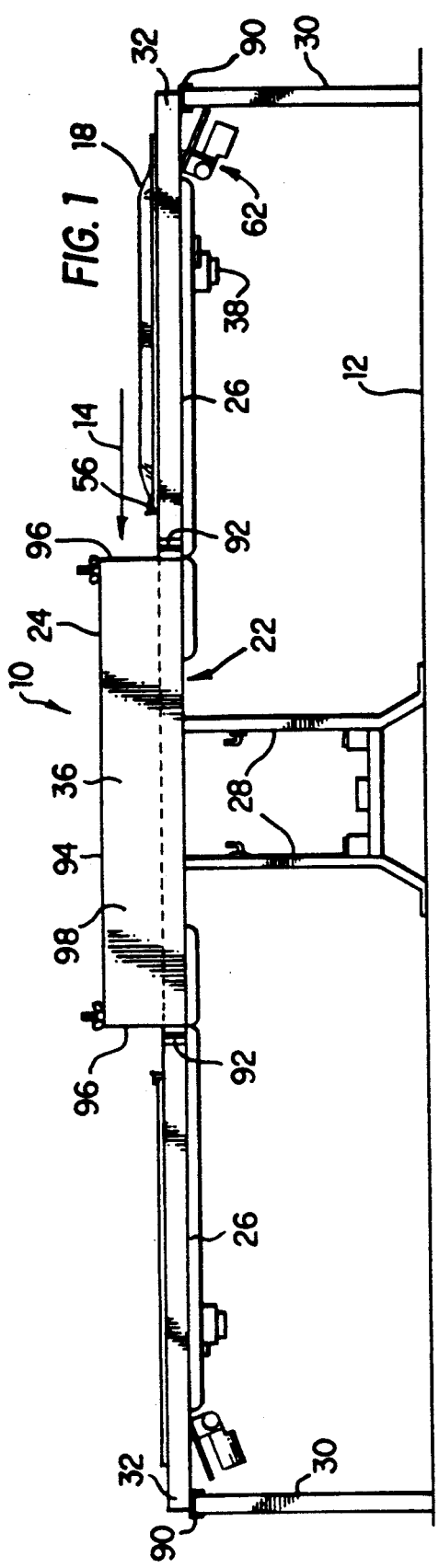
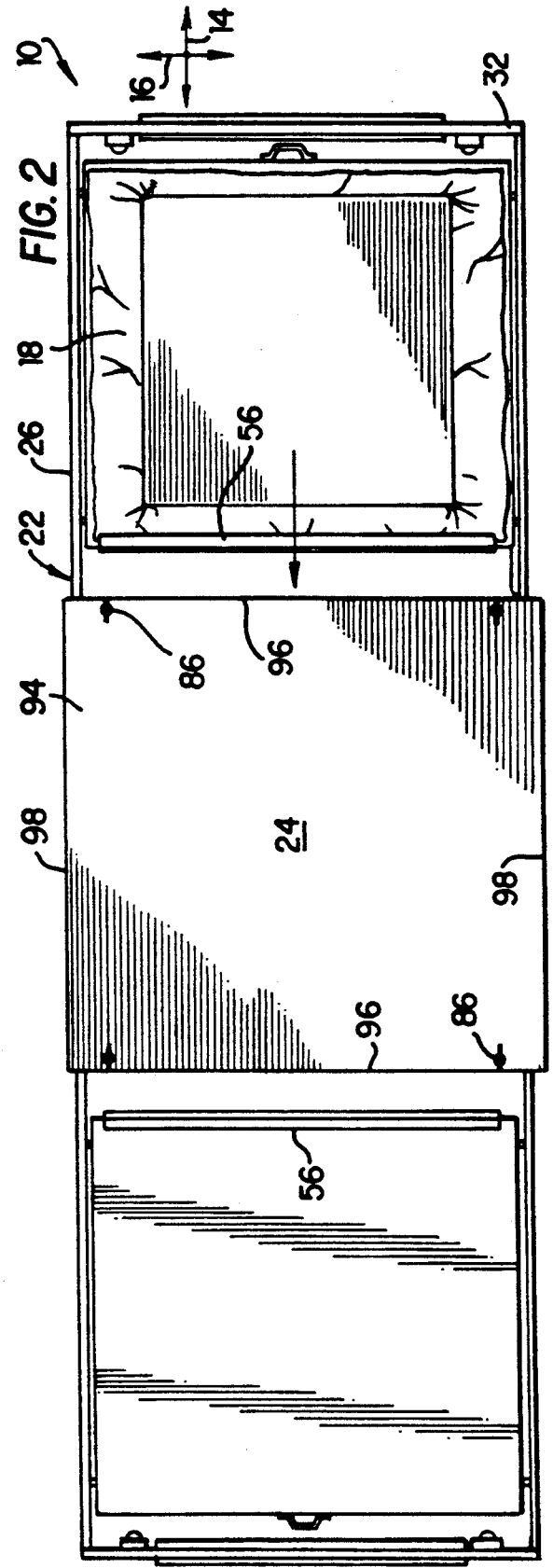

PANEL SEALING SYSTEM

BACKGROUND OF THE INVENTION

1. Field of the Invention

This invention relates to a panel sealing system for coating or providing a laminate structure for a panel. In particular, this invention directs itself to a coating or layering for a panel which provides a substantially smooth outer surface for the combined layer or coated structure to permit extended useful life of the panel structure, and to allow ease in cleaning of a panel during its operational lifetime. More in particular, this invention is directed to a panel sealing system which provides for a plastic layer to be heat sealed to a panel member to provide an outer closed cell coating or layering for the panel member. More in particular, this invention relates to a panel sealing system which provides an apparatus where a panel member is mounted on an extension frame and then manually inserted into a heating chamber where the heat sealing takes place. Still further, this invention directs itself to a panel sealing system where a panel member and a sheet of plastic is mounted thereover on an extension section of an apparatus followed by a securing of the plastic in fixed relation to the panel member prior to the heat sealing process. Further in particular, this invention directs itself to a system whereby the securement of the plastic layer to the panel member prior to the heat sealing process allows for a smooth coating to be applied to the panel member and aids in cleaning processes during the lifetime of the panel member. Further, this invention directs itself to an automatic panel sealing system whereby subsequent to heat sealing within a heat chamber, the coated or layered panel structure is automatically removed from the heat chamber to allow insertion of another panel structure in consecutive order. Additionally, this invention directs itself to a system which may be brought to the job site and set up for substantial portability considerations. Additionally, this panel sealing system allows for a centrally located heating chamber which may be adjustable as to heat transferred to the coated or layered panel structure when such is inserted within the heating chamber. Still further, this invention relates to a panel sealing system which allows for insert into the heating chamber from opposing ends and allows for rapid heat sealing of panel structures.

2. Prior Art

Methods and apparatus for coating panel members with a thermoplastic film covering are known in the art. The closest prior art known to applicant includes U.S. Pat. Nos. 3,202,561; 4,447,282; 3,092,203; 3,912,542; 4,894,102; 4,664,737; and, 4,666,540.

In some methods and systems for providing a thermoplastic film covering over a panel member such as shown in U.S. Pat. No. 3,202,561, heat is applied through an electrical resistance type system and the panel and covering are maintained on a bed member through a vacuum fan type arrangement. However, in such prior art methods, the actual heating chamber is not heat adjustable to optimize the heating transfer characteristics in order to heat seal the thermoplastic layer to the panel member in an optimized time frame. Additionally, such prior art systems do not appear to allow for automatic removal subsequent to a predetermined time interval from the heating chamber. Thus, the heat sealing is not optimized and the panel and thermoplastic coating or layer may be maintained within the uncontrolled heat chamber for a non-optimized time which would result in either not providing a complete heat sealing process, or alternatively, in providing excess thermoplastic flow on the panel member which may have the effect of providing a non-smooth surface for the coated panel member.

In other prior art systems such as that shown in U.S. Pat. No. 4,894,102, methods for refinishing building panels are provided. In such prior art systems, plastic layers are applied to panel members, however, such systems do not provide for automatic removal of the panel members subsequent to heating within a heating chamber. Such prior art systems require the operator to remove the relatively hot coated panel members from within the heating chamber in a manual operation which may result in injury due to the fact that such heating chambers maintain a high temperature atmosphere for the heat sealing process. Additionally, such prior art systems do not provide for the heat adjustment within the heat chamber to optimize the overall heat sealing process, as provided in the subject invention concept. Still further, methods and systems such as that provided in U.S. Pat. No. 4,894,102 specifically direct themselves to maintaining the plastic layer member in an completely unrestrained manner. Such systems do not provide for a mechanism whereby the thermoplastic layer is secured in fixed relation to the panel member prior to heating and thus, such prior art systems do not allow for a taut condition to apply which results in a non-smooth panel structure coated member subsequent to the heating process.

Other prior art systems provide for securing blankets or other layers on a panel structure mounted on a vacuum bed member, however, such prior art systems provide for mountings on the side of the overall structure which utilizes a net for holding a layer in a taut condition. Such netting provides for openings through which hooks or other securement mechanisms may be maintained in position. Such mountings are cumbersome and require additional structure other than the closed cell layer which is itself being heat sealed.

In other methods of refurbishing building panels, as shown in U.S. Pat. No. 4,666,540, tiles or panels are initially sprayed with an adhesive and some type of decorative material is attached. The combination is run through some pressure rollers which provide for the bonding. Such prior art systems do not provide for the complete heat sealing and resulting smooth finishes which allows for simplicity in cleaning of the combined panel and layer structure subsequent to the process being completed.

SUMMARY OF THE INVENTION

A panel sealing system is provided which includes a base frame defining a heating housing including a heat chamber formed therein and at least one longitudinally extending end section. A mechanism is provided for releasably securing a panel member to the longitudinally extending end section and a further mechanism is provided for fixedly mounting a plastic layer to the panel member. The combined panel member and plastic layer are reversibly displaced into and out of the heat chamber and a mechanism is provided for adjustably heating the panel member and the plastic layer combination within the heat chamber.

An object of the subject invention is to provide a panel sealing system which will layer or coat a panel member with a smooth coating surface for extending the life of the panel member and to allow for easy cleaning.

A further object of the subject invention is to provide a smooth closed cell plastic coating for a panel member which allows for a smooth surface which can easily be washed or cleaned by a user.

A still further object of the present invention is to provide a panel sealing system which is substantially portable in nature and may be set up in a simplified manner on-site where a plurality of panel members are to be coated.

Another object of the subject invention is to provide a panel sealing system where plastic layered panel members are inserted into a heating chamber for heat sealing of the plastic layers to the panel members in an optimized fashion.

Another object of the subject invention is to provide a panel sealing system which automatically allows retraction of a heat sealed panel member from within a heating chamber after a predetermined time interval.

A still further object of the subject invention is to provide a panel sealing system which allows for adjustability of the heating within a heating chamber within which a combined plastic layer and panel member are inserted.

BRIEF DESCRIPTION OF THE FIGURES

FIG. 1 is an elevational view of the subject panel sealing system;

FIG. 2 is a plan view of the subject panel sealing system;

DESCRIPTION OF THE PREFERRED EMBODIMENTS

Figure 9:
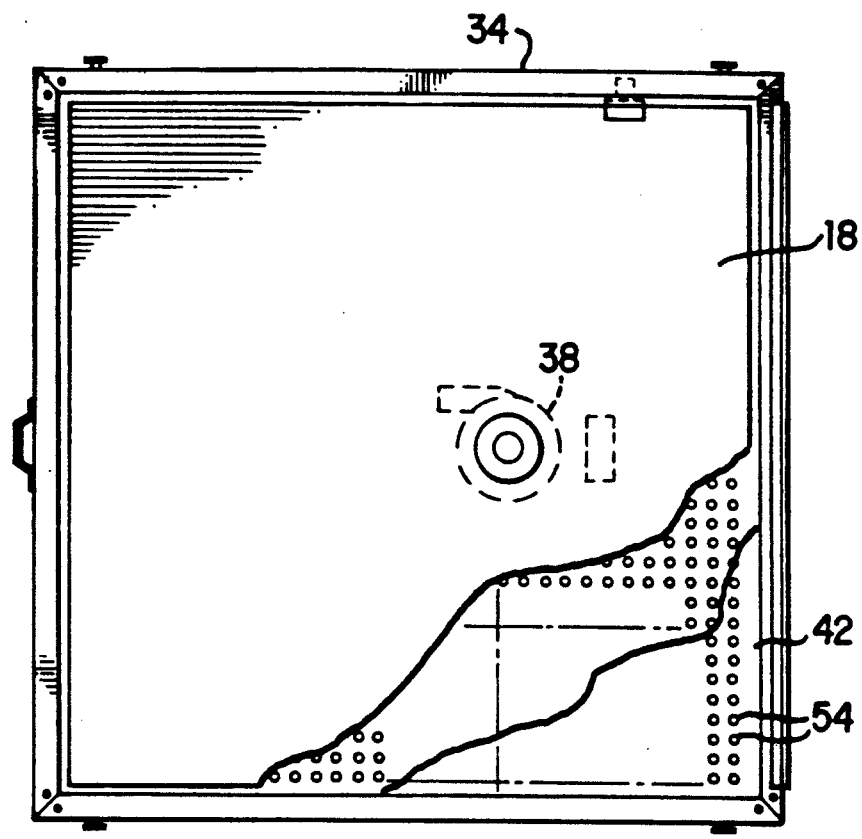
FIG. 9 is a plan view partially cut-away showing the mounting of the plastic layer and panel member on the movable end section housing.
Figure 10:
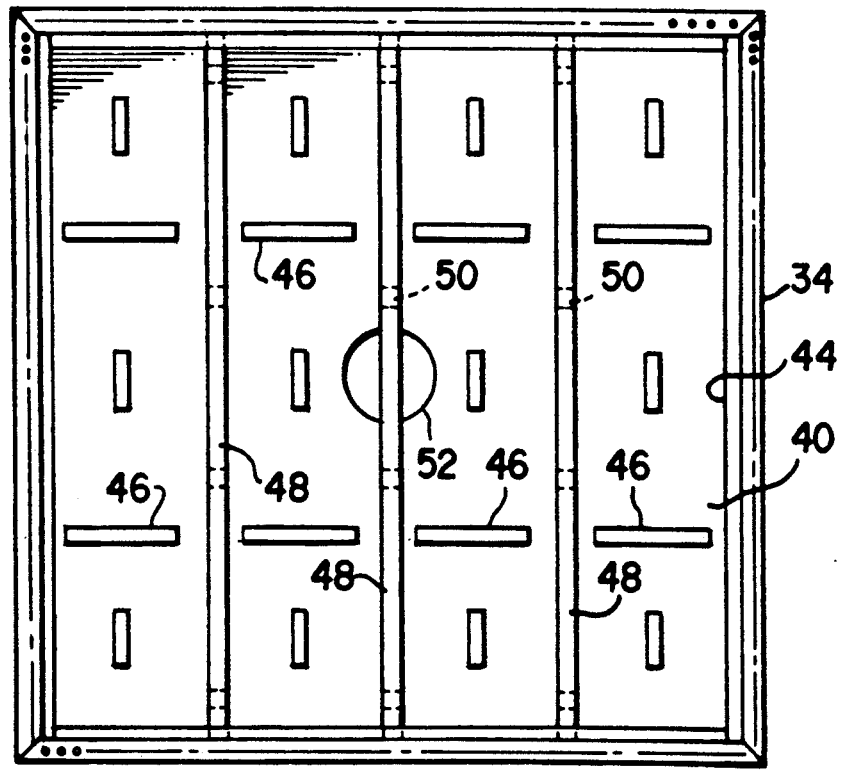
FIG. 10 is a plan view of the internal chamber provided for the end section housing.
Figure 11:
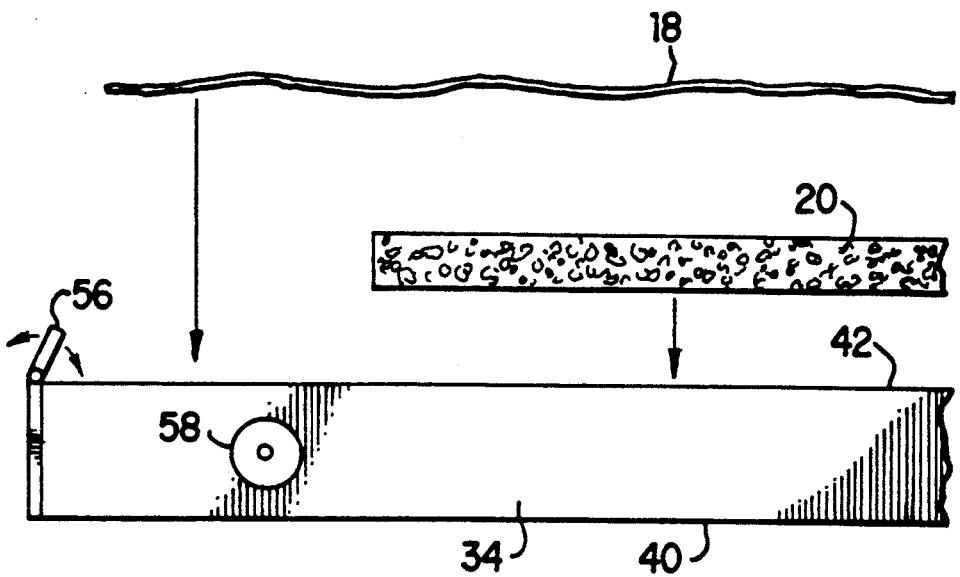
FIG. 11 is an elevational view showing positional relations of the panel member and the plastic layer prior to mounting on the panel sealing system; and, FIG. 12 is a elevational positional view showing the plastic layer mounted over the panel member on the displaceable end section housing.
Figure 12:
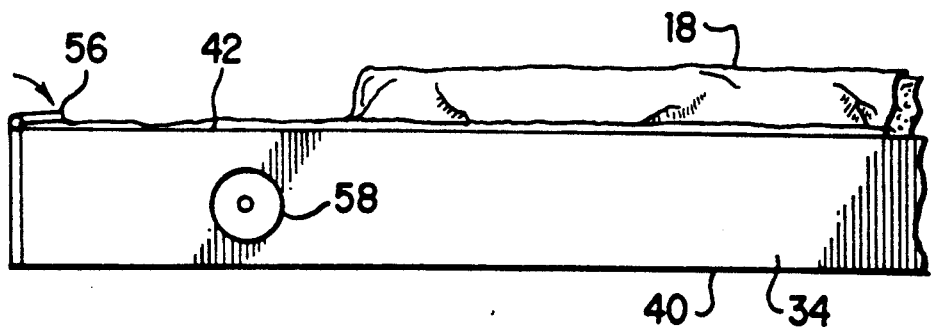

Referring now to FIGS. 1-12, there is shown panel sealing system 10 for heat sealing plastic layers 18 to generally porous tile-like boards or panel members 20 as shown in FIGS. 11 and 12. In general, panel members 20 are substantially porous in the nature of acoustic ceiling tile members commonly used as ceiling structures in commercial, as well as domestic edifices. Panel members 20 are acoustically structured to absorb sound and thus, there is a porosity factor associated with such panel members 20. However, due to the porosity and the environment within which such panel members are maintained, there is a tendency for dirt and other waste materials to collect on the surface and within the pores of panel members 20.

The cleaning of panel members 20 having a relatively high porosity is extremely difficult, and in general, such panel members 20 when dirtied or otherwise contaminated, were generally disposed of as waste material. However, panel sealing system 10 as herein described provides for a closed cell plastic layer 18 to be heat sealed to panel members 20 to provide a substantially clear and smooth exterior surface which may be cleansed in a simple and expeditious fashion. Thus, by use of panel sealing system 10 as herein described, the life of panel members 20 is increased dramatically, resulting in lower costs to the consumer.

Panel sealing system 10 includes base frame 22 which defines heating housing 24 and a pair of longitudinally extending end sections 26 shown in FIGS. 1 and 2. As can be seen, heating housing 24 occupies a central location between opposing longitudinally extending end sections 26. For the sake of clarity, only one longitudinally extending end section 26 will be described in detail, and it is to be understood that the other longitudinally extending end section 26 is substantially identical therewith.

Panel sealing system 10, having base frame 22, extends in longitudinal direction 14 and includes a dimension in transverse direction 16, as is clearly evident in FIG. 2. Additionally, base frame 22 of panel sealing system 10 is adapted to be mounted on base surface 12, as clearly seen in FIG. 1. Heating housing leg members 28 are secured to a bottom surface of heating housing 24 and provides stabilization of panel sealing system 10 on base surface 12. Additionally, each longitudinally extending end section 26 includes pairs of end section leg members 30 for interface with end sections 26 on one end and base surface 12 on an opposing end, as is seen in FIG. 1.

Longitudinally extending end section 26 includes fixedly located end section frame 32 shown in FIGS. 1 and 2. Internal end section base frame housing 34, more clearly seen in FIGS. 6-8 and 11-12, is displaceable in longitudinal direction 14 with respect to heating housing 24 and internal heating chamber 36 formed within heating housing 24. Additionally, internal end section base frame housing 34 is longitudinally displaceable with respect to fixedly located end section frame 32 to allow internal end section base frame housing 34 to be moved or displaced in longitudinal direction 14 from external heating chamber 36 to an internal location within heating chamber 36.

Base frame longitudinally extending end section 26 further includes vacuum mechanism 38 which is positionally seen in FIGS. 1 and 9. Vacuum mechanism 38 may be a standard fan type system well-known in the art and is mounted to a lower surface of displaceable internal end section base frame housing 34 for providing a predetermined pressure differential for releasably securing panel member 20 to displaceable internal end section base frame housing 34 during operation of panel sealing system 10. The general concept in the utilization of vacuum fan mechanism 38 is to provide a suction force which releasably secures panel member 20 and covering plastic layer 18 during the operational phase of panel sealing system 10. Internal end section base frame housing 34 is formed of lower member 40 and upper member 42 seen in FIGS. 9 and 10, as well as FIGS. 11 and 12. In this manner, there is formed an end section chamber 44. A plurality of transversely directed baffle plate members 46 are rigidly secured to lower member 40, as is seen in FIG. 10. Additionally, longitudinally directed baffle plate members 48 are provided with passage openings 50 formed therethrough to allow a fluid communication throughout differing portions of end section chamber 44. Vacuum fan mechanism 38 is coupled to end section chamber 44 through lower member opening 52, as is seen in FIG. 10. In this manner, it has been found that a substantial equalization of pressure differential is provided for end section chamber 44 throughout the plan contour, as shown in FIGS. 9 and 10. Upper member 42 of displaceable internal end section base frame housing 34 is provided with a plurality of upper member openings 54 which communicate with the internal portion of end section chamber 44. Upper member openings 54 are formed throughout the plan contour of upper member 42, as is seen.

In this manner, panel member 20 is mounted contiguous an upper surface of upper member 42 and plastic layer 18 is positionally located over panel member 20, as is seen in FIGS. 11 and 12. The mounting of panel member 20 and plastic layer 18 on upper member 42 is the initialization of the operational phase of panel sealing system 10. In this manner, panel member 20 is somewhat secured to upper member 42 and is not displaceable with respect thereto when displaceable internal end section base frame housing 34 is displaced internal to heating housing 24.

It has been found that even with vacuum fan mechanism 38 in operation, when plastic layer 18 is placed over panel member 20, wrinkles and other anomalies occur in the surface being heat sealed within heating chamber 36. This problem was found to diminish the overall effectivity of panel sealing system 10 and there is necessitated a mechanism for securing plastic layer 18 on panel member 20 in more secure manner than that which has been previously known. In order to alleviate and obviate this problem, there is provided a mechanism for securing plastic layer 18 to upper member 42 of displaceable internal end section base frame housing 34. As seen in FIGS. 11 and 12, spring biased lug 56 is mounted on an edge of frame housing 34 and captures plastic layer 18 between end section housing upper member 42 and spring biased lug securing member 56. In this manner, plastic layer 18 is maintained in a taut and contiguous interface with panel member 20 to provide a smooth surface prior to insert into heating chamber 36. This securement of plastic layer 18 in a fixed manner to panel member 20 results in a heat sealing which provides for a continuous closed cell resulting layer over panel member 20.

Figure 3:
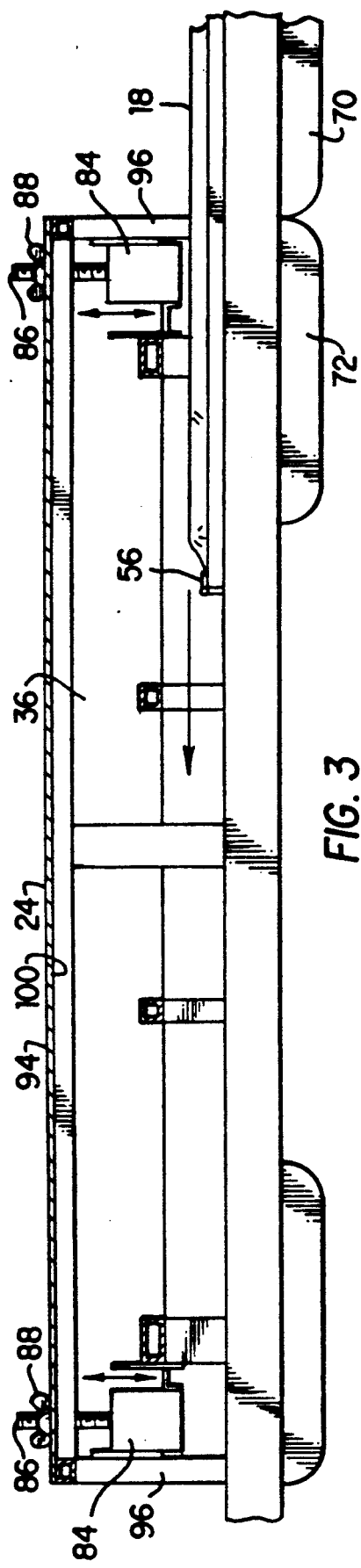
FIG. 3 is a cross-sectional view, partially cut-away of the heating chamber provided for the panel sealing system.
Figure 5:
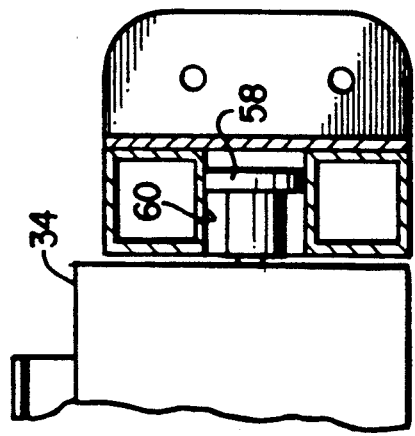
FIG. 5 is an elevational view partially cut-away of the drive mechanism for displacement of the combined panel member and plastic layer into the heating chamber.
Figure 4:
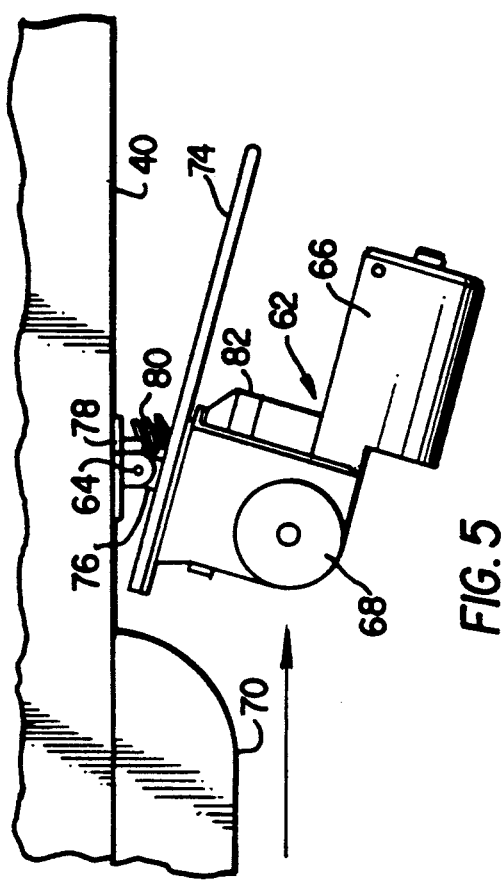
FIG. 4 is a cross-sectional view, partially cut-away of the displacement mechanism for the combined panel structure and plastic layer coating.
Figure 8:
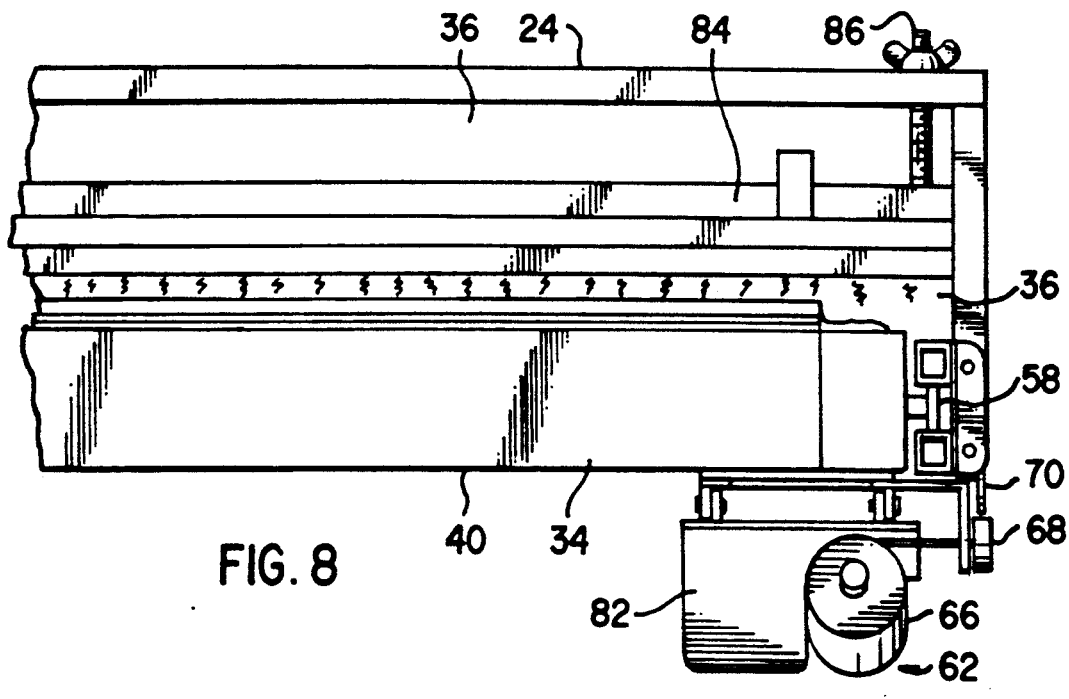
FIG. 8 is a cross-sectional elevational view, partially cut-away, of the heating chamber having a panel member and plastic coating contained therein.

In order for both panel member 20 and plastic layer 18 to be subjected to heat transfer within heating chamber 36, there is the necessity of providing a mechanism for reversibly displacing panel member 20 and plastic layer 18 into and out of heating chamber 36. As can be seen in FIGS. 4 and 8, roller members 58 extend from opposing transverse sides of internal end section base frame housing 34. Roller members 58 are rotatably displaceable within cooperating longitudinally extending tracks 60 and extend throughout the longitudinal length of heating housing 24 and longitudinally extending end section 26 to allow longitudinal displacement of internal end section base frame housing 34.

The mechanism for longitudinally reversibly displacing internal end section base frame housing 34 internal and external heating chamber 36 formed within heating housing 24 is clearly shown in FIGS. 5-8. The mechanism for longitudinal reversible displacement includes drive mechanism 62 which is pivotally coupled at pivot point 64 to lower member 40 of internal end section base frame housing 34. Drive mechanism 62 includes motor 66 which through appropriate gearing, drives motor wheel 68 in a rotative displacement mode of operation. Motor wheel 68 is rotatably displaceable responsive to actuation of motor 66. Motor wheel member 68 frictionally engages lower side members of fixedly located end section frame 32 and further engages heating chamber lower side members 72 and displaceable internal end section base frame housing 34 is longitudinally displaced, as has previously been described. Lever or plate member 74 is mounted on a top surface and fixedly secured to drive mechanism 62, as is clearly seen in FIG. 5. Lever member 74 has extending therefrom lug member 76 which is pivotally secured to plate member 78 through pivot point 64. Spring member 80 maintains a spring bias about pivot point 64 located beneath lower member 40 of internal end section frame housing 34 to allow disengagement of wheel member 68 from lower side members 70 and 72 of fixedly located end section frame 32 and heating housing 24, as is seen in FIGS. 3 and 5-8.

Figure 6:
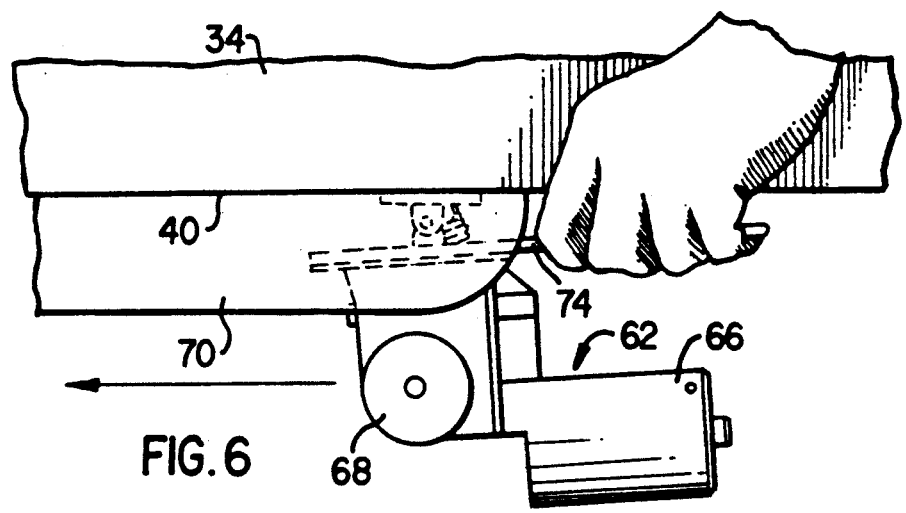
FIG. 6 is an elevational view of the drive mechanism showing manual actuation of the drive mechanism.

As shown in FIG. 6, the user may grasp lever member 74 to displace motor wheel 68 out of contact with lower side members 70 and displaceable internal end section base frame housing 34 may be displaced in longitudinal direction 14 to be inserted within heating chamber 36 of heating housing 24. As motor wheel member 68 is displaced from the lower surface of lower side member 70, frame member 34 may be rolled through roller members 58 and cooperating tracks 60 to provide freedom of displacement in longitudinal direction 14.

Figure 7:
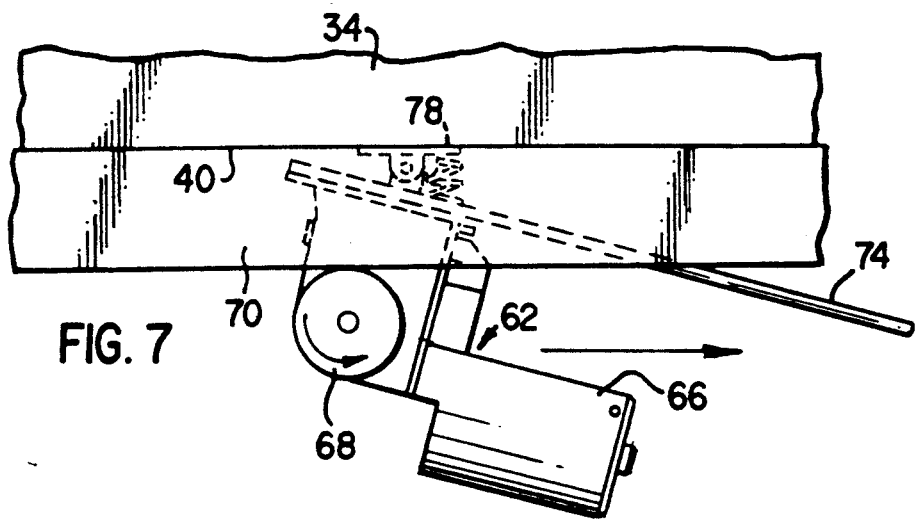
FIG. 7 is an elevational view of the drive mechanism partially cut-away showing a retraction mode of operation for removal of the combined panel member and sealed plastic coating.

The overall drive mechanism further includes a standard timer for actuating motor 66. Timer mechanisms which may be adjusted for particular lengths of time are well-known in the commercial marketplace and such timer 82 actuates motor 66 subsequent to a predetermined time interval when internal end section base frame housing 34 is located within heating chamber 36. Upon actuation of motor 66, displaceable internal end section base frame housing 34 is driven external heating chamber 36, as is shown in FIG. 7 with motor wheel 68 in contact with a lower surface of lower side members 70 or 72.

In this manner, end section base frame housing 34 is automatically removed from heating chamber 36 after a predetermined time interval. Thus, as is shown in FIG. 6, the initiation of the displacement of base frame housing 34 is provided by manually lifting up lever 74 to allow displacement of frame housing 34 in longitudinal direction 14. Once frame housing 34 is mounted internal to heating chamber 36, motor wheel member 68 is in contact with heating chamber lower side 72 and frictionally is engaged therewith. Upon a predetermined time interval passing throughout which panel member 20 and plastic layer 18 are being heat sealed, timer 82 actuates motor drive 66 which causes rotation of motor wheel 68 in frictional contact with a lower surface of lower side members 70 and 72 to remove the entire internal end section base frame housing 34 from within heating chamber 36.

Panel sealing system 10 further includes a mechanism for adjustably heating the combination of the panel member 20 and plastic layer 18 within heating chamber 36. A mechanism for electrically heating the heat chamber 36 internal atmosphere is provided by vertically adjustable electrical housing 84 shown in FIGS. 3 and 8. Vertically adjustable electrical housing 84 includes a standard electrical coil for heating plastic layer 18 and panel member 20. In order to allow adjustability of the heat sealing temperatures within heat chamber 36, there is provided a mechanism for adjusting the vertical clearance between electrical housing 84 and the upper surface of plastic layer 18 covering panel member 20. As further seen in FIGS. 3 and 8, there is provided bolt or threaded member 86 which is fixedly attached or coupled to an upper surface of vertically adjustable electrical housing 84. Nut member 88 which may be a wing nut member is threadedly secured to bolt member 86 and is in contiguous interface with an external surface of an upper member of housing 24, as is clearly shown. In this manner, rotation of wing nut members 88 allows for vertical displacement of vertically adjustable electrical housing 84 to provide a varying clearance between housing 84 and an upper surface of covering plastic layer 18. The user, at his or her discretion, dependent upon temperatures maintained within heating chamber 36, may bring electrical housing 84 into closer contact with plastic layer 18, if such is necessary for the final heat sealing process.

In overall operation concept, panel member or acoustic tile 20 is mounted on upper member 42 of displacement internal end section base frame housing 34. Plastic layer 18 which may be cut from a roll or otherwise provided in an appropriate contour is placed over panel member 20 and is positionally located, as is shown in FIGS. 1 and 2. In this step of the operation, plastic layer 18 and panel member 20 are positionally located external to heating housing 24. Plastic layer 18 is contiguously located over panel member 20 and is pressed into position surrounding panel member 18. Plastic layer 18 is inserted under spring-biased lug member 56 to fixedly secure plastic layer 18 to panel member 20.

Vacuum fan mechanism 38 is actuated in order to releasably secure panel member 20 to upper member 42 of displaceable internal end section base frame housing 34. Through use of baffle members 46 and 48, substantially equal pressure differentials are provided throughout the plan contour of panel member 20.

Subsequent to this operation, as is shown in FIG. 6, lever 74 is manually displaced to an upper position adjacent lower member 40 and displaces motor wheel member 68 from lower side member 70. Base frame housing 34 is then free to be moved in longitudinal direction 14 through cooperation of the roller members 58 and the tracks 60 for insert of frame housing 34 within heating chamber 36.

Heating is effected for a predetermined period of time and with lever 74 released, motor wheel 68 is in frictional engagement with a lower surface of side members 70 or 72. Upon a predetermined time interval, timer 82 actuates motor 66 and drives or displaces frame housing 34 in a reverse direction external heating chamber 36 upon which there is heat sealing of plastic layer 18 to panel member 20.

In general, the overall structure of panel sealing system 10 is provided by heat housing 24 attached on opposing longitudinal ends to a pair of longitudinally extending end sections 26, as is clearly seen in FIGS. 1 and 2. Longitudinally extending end sections 26 contain therein displaceable internal end section base frame housings 34 which are movably displaceable with respect to the fixedly located end section frames 32. End section leg members 30 may be mounted to fixedly located end section frame 32 by insert within U-shaped angle irons 90 shown in FIG. 1. Leg members 30 may be secured through bolting, welding, or some like technique, not important to the inventive concept as herein described. Additionally, end section frames 32 may be secured to the centrally located heat housing 24 through bolts 92 which may be inserted in interlocking fashion between heat housing 24 and end section frame 32 to provide a simplified set-up on a job site. Heat housing leg members 28 may be secured to a lower surface of heat housing 24 through bolting, welding, or some like technique, not important to the inventive concept as herein described, with the exception that leg members 28 provide a stabilized base on base surface 12 for base frame 22.

Additionally, structural components of end section leg members 30, heat housing leg members 28, and fixedly located end section frame 32, as well as displaceable internal end section base frame housing 34, may be formed of a metallic composition such as aluminum, steel, or some like structural component, not important to the inventive concept as herein described, with the exception that such be capable of accepting the structural loads applied thereto.

Heat housing 24 includes heat housing upper ceiling wall member 94 and a pair of heat housing opposing longitudinal walls 96, as well as heat housing opposing transverse side walls 98 to provide heating chamber 36. Wall members 94, 96 and 98 may be formed of aluminum, steel, or other like metal composition, and arranged in a manner to provide internal heating chamber 36 clearly shown in FIG. 3, which allows the combined panel member 20 and plastic layer 18 to be inserted therein for heating purposes. Each of upper walls 94, longitudinally opposing walls 96, and opposing transverse walls 98 include inner surface 100 which may be either coated with a highly reflective coating, or may be polished to provide a reflective surface 100 in order to reflect heat generated within electrical housings 84 and to have a result of increasing the temperature within heating chamber 36 for reducing the wattage necessary to produce a heat sealing temperature environment.

Panel members 20 may be of varying compositions and may be of the acoustic panelling type, well-known in the art. Such compositions may include glass-fiber panels, mineral wood panels, fiberboard panels, polystyrene panels, perlite panels, or other like composition panel members. Plastic layers 18 are generally of the thermoplastic variety which are high polymers that soften when exposed to heat and generally return to their original conditions when cooled to a room temperature. Thermoplastic compositions, although directed to natural substances, are generally referred to in the art as synthetics, such as polyvinyl chloride, nylons, fluorocarbons, linear polyethyelene, polyurethane prepolymer, polystyrene, polypropylene, and various cellulosic and acrylic resins. The thickness of the thermoplastic layers 18 used in the invention concept have successfully been used with a thickness between 1-3 mil. and have successfully been coated with temperatures between 150° F. to approximately 250° F. Where polyvinyl chloride has been used, it has been found that at about 200° F., the sheet softens to cause the sheet to conform to the contour of panel member 20 and then sets when removed from heating chamber 36 after a predetermined time interval approximating 15-30 seconds within the controlled temperature environment.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A panel sealing system for use in refurbishing panels on-site, comprising:
    (a) a base frame defining a heating housing including a heat chamber and at least one longitudinally extending end section, said base frame longitudinally extending end section including (1) a fixedly located end section frame, (2) an internal end section base frame housing displaceable in a longitudinal direction with respect to said heat chamber and said fixedly located end section frame, and (3) vacuum means mounted to a lower surface of said displaceable interanl end section base frame housing for providing a predetermined pressure differential for releasably securing said panel member to said displaceable internal end section base frame housing;
    (b) means for releasably securing a panel member to said displaceable internal end section base frame housing;
    (c) means for fixedly mounting a plastic layer to said panel member, said means for fixedly mounting said plastic layer to said panel member including at least one spring biased lug securing member mounted to an edge of said base frame housing for capturing said plastic layer between an end section housing upper member and said spring biased lug securing member to thereby enable said plastic layer to be tautly applied contiguous to said panel member;
    (d) means for reversibly displacing said panel member and said plastic layer into and out of said heat chamber, said means for reversibly displacing said panel member and said plastic layer including (1) means for automatically displacing said panel member and said plastic layer from said heat chamber coupled to said internal end section base frame housing, and (2) means for manually displacing said panel member and said plastic layer into said heat chamber coupled to said automatic displacement means; and,
    (e) means for adjustably heating said panel member and said plastic layer within said heat chamber to thereby heat seal said plastic layer to said panel member.

2. The panel sealing system as recited in claim 1 where said internal end section base frame housing includes an end section housing defining an end section chamber, said end section housing having an end section housing upper member including a plurality of openings formed therethrough.

3. The panel sealing system as recited in claim 2 including a plurality of first baffle plate members fixedly secured in a first direction to said internal end section base frame housing within said end section chamber and a plurality of second baffle plate members fixedly secured in a second direction to said internal end section base frame housing within said end section chamber, said second direction being orthogonal said first direction for substantially equalizing said pressure differential applied by said vacuum means to said panel member.

4. The panel sealing system as recited in claim 1 where said means for reversibly displacing said panel member and said plastic layer includes at least a pair of roller members extending from opposing transverse sides of internal end section base frame housing, said roller members being rotatably displaceable within cooperating longitudinally extending tracks formed within said fixedly located end section frame and said heating housing of said base frame.

5. The panel sealing system as recited in claim 4 where said automatic displacement means includes:
    (a) drive means pivotally coupled to a lower member of said internal end section base frame housing; and,
    (b) timer means for actuating said drive means after a predetermined time interval when said internal end section base frame housing is within said heat chamber.

6. The panel sealing system as recited in claim 5 where said drive means includes:
    (a) motor means; and,
    (b) a wheel member coupled to said motor means and rotatively displaceable responsive to actuation of said motor means, said wheel member for frictionally engaging lower side members of said fixedly located end section frame and said heating housing.

7. The panel sealing system as recited in claim 6 where said drive means is spring biased about a pivot point located below said lower member of said internal end section base frame housing for disengagement of said wheel member from said lower side members of said fixedly located end section frame.

8. The panel sealing system as recited in claim 7 where said manual displacement means includes a lever member coupled to said motor means and said wheel member for rotating said drive means about said pivot point for disengagement of said wheel member from said lower side members for manually displacing said internal end section base frame housing with respect to said fixedly located end section frame.

9. The panel sealing system as recited in claim 1 where said means for adjustably heating includes:
    (a) means for electrically heating said heat chamber internal atmosphere when said plastic layer and said panel member are displaced internal said heat chamber; and,
    (b) means for displacing said electrical heating means relative to an upper member of said heating housing affixed to said electrical heating means to thereby adjust a vertical clearance between said electrical heating means and said combined plastic layer and panel member.

10. The panel sealing system as recited in claim 9 where said means for displacing said electrical heating means includes at least one vertically adjustable electrical housing containing said electrical heating means.

11. The panel sealing system as recited in claim 10 where said means for displacing said electrical heating means includes threaded displacement means fixedly coupled to said vertically adjustable electrical housing.

12. The panel sealing system as recited in claim 11 where said threaded displacement means includes:
   (a) a threaded bolt member secured to said vertically adjustable electrical housing, said threaded bolt member extending through said upper member of said heating housing; and,
   (b) a nut member threadedly secured to said threaded bolt member external said heat chamber and interfacing with an external surface of said upper member of said heating housing.

13. The panel sealing system as recited in claim 1 including a pair of longitudinally extending end sections mounted to said heating housing on opposing longitudinally displaced ends thereof.

* * * * *